(12) United States Patent
Mirza (10) Patent No.: US 10,788,732 B1
(45) Date of Patent: Sep. 29, 2020

(54) FOLDABLE SCREEN SHADE FOR DIGITAL CAMERA

(71) Applicant: Moid Uddin Mirza, Oakwood Village, OH (US)

(72) Inventor: Moid Uddin Mirza, Oakwood Village, OH (US)

(*) Notice: Subject to any disclaimer, the term of this patent is extended or adjusted under 35 U.S.C. 154(b) by 0 days.

(21) Appl. No.: 16/705,718

(22) Filed: Dec. 6, 2019

(51) Int. Cl.
| | |
|---|---|
| *G02B 23/16* | (2006.01) |
| *G03B 11/04* | (2006.01) |
| *G02B 23/20* | (2006.01) |

(52) U.S. Cl.
CPC ............ *G03B 11/046* (2013.01); *G02B 23/16* (2013.01); *G02B 23/20* (2013.01)

(58) Field of Classification Search
CPC ........ G02B 21/00; G02B 23/16; G02B 23/20; G02B 27/00; G02B 27/0006; G03B 11/046; H04N 5/64; H04N 5/2251
See application file for complete search history.

(56) References Cited

U.S. PATENT DOCUMENTS

| | | | |
|---|---|---|---|
| 1,263,684 A | 4/1918 | Leach | |
| 4,208,676 A * | 6/1980 | Berwick | .............. H04N 5/7408 348/781 |
| 5,069,529 A * | 12/1991 | Takahashi | .............. G02B 27/04 348/834 |
| 6,144,419 A | 11/2000 | Schmidt | |
| 6,394,615 B1 | 5/2002 | Hill et al. | |
| 6,453,125 B2 | 9/2002 | Shono | |
| 7,034,877 B2 | 4/2006 | Schmidt | |
| 7,386,229 B2 | 6/2008 | Schmidt et al. | |
| 7,486,887 B2 | 2/2009 | Tian | |
| 2010/0321553 A1 | 12/2010 | Margolin | |
| 2013/0250423 A1 * | 9/2013 | Trantham | ............... G02B 27/04 359/601 |

OTHER PUBLICATIONS

Steve's DigiCams "Hardware Reviews Hoodman LCD Sun Shade" [online]. Steve's DigiCams Online, Inc., 1999. [Retrieved on May 19, 2020]. Retrieved from the internet: <URL: http://www.steves-digicams.com/hoodman.html>.
Steve's DigiCams "Hardware Reviews Jar Sun Shield" [online]. Steve's DigiCams Online, Inc., 1999. [Retrieved on May 19, 2020]. Retrieved from internet: <URL: http://www.steves-digicams.com/jar_shield.html>.

* cited by examiner

*Primary Examiner* — Thong Q Nguyen
(74) *Attorney, Agent, or Firm* — Christopher H. Hunter; Deepa Mishra

(57) ABSTRACT

A portable screen shade for a camera display includes a pre-cut, foldable cardstock sheet with four adjacent panels. Each panel has an irregular hexagonal configuration, with a larger base end tapering to a narrower viewing end. The base ends of the panels are interconnected along fold lines, with the end edges of the bases extending along a common plane. Each narrow end is spaced apart from an adjacent panel, with the narrow end edges also extending along a common plane. The sheet can be folded into a four-sided partial pyramidal frustum configuration, with an enlarged end configured to be located against the camera screen, and a narrower viewing end, with the sides of adjacent panels connected by an adhesive strip or tab-in-slot. Flap tabs springs extend across fold lines on pairs of the panels to maintain the screen shade in an expanded configuration, and enable it to be folded flat.

20 Claims, 5 Drawing Sheets

FOLDABLE SCREEN SHADE FOR DIGITAL CAMERA

FIELD OF THE INVENTION

The subject invention relates generally to portable shades that improve the viewability of digital display screens.

BACKGROUND

Digital displays such as Liquid Crystal Display (LCD) screens are advantageously used in a wide range of modern consumer products such as cameras and cellphones. The LCD screen on a digital camera is typically a rectangular flat screen located on the back of camera body, for ease of use. In addition to functioning as a live viewfinder allowing composition and focus of an image, the screen can display a number of other necessary readouts and data that are important to a digital photographer.

When working indoors, LCD screen displays are normally bright and sharp. However, when the user goes outside, glare from sunlight can result in an almost unreadable display on the screens, which can render the digital device effectively unusable.

To address this issue, a variety of accessories are commercially available to digital photographers.

These accessories can be generally grouped into two categories. The first category includes simple hoods, shields and shades, exemplified by U.S. Pat. Nos. 7,034,877 and 7,486,887. The second category includes a variety of LCD viewfinders and loupes as illustrated in U.S. Pat. Nos. 6,453,125 and 7,386,229. Most of the LCD shades in the first category are basically three-sided sun-visors, which still allow reflective light to infiltrate the shade and effect the LCD screen display. The products of the second category are designed to eliminate glare from all sides; however, their main function is limited to the composition and focus of an image through a magnifying glass permanently fixed at the viewing end. Still other challenges exist with products from either category. For example, shades or loupes need to be fixedly attached to a camera LCD screen. Straps and other mounting devices like brackets are employed to fasten these accessory devices to the screen display. However, straps and other such devices can be awkward and bulky, and as a result, difficult and time-consuming to attach to and remove from the back of the camera. The mounting devices can also hinder access to important control buttons and features on the camera and can add weight to the camera which can cause the user to become fatigued and have difficulty in continuing to use the camera.

Some of the brackets or other mounting devices also require that they be permanently glued along the edges of the screen. This is an unacceptable option for many camera owners.

Still further, many of the available shades are collapsible to store; however, even after folding, the shades can occupy significant space in the camera bag of a photographer. Some of these types of shades also include coiled springs or hinge-loaded springs in order to facilitate collapsing and expanding the shade. Such components, however, can add complexity and cost to the shade, and weight to the camera during use.

As such, it is believed there is a demand for an improved screen shade, and in particular a simple, lightweight and inexpensive screen shade that completely encompasses the digital screen to reduce glare, allows unrestricted access to control buttons, is easy to attach and remove from the camera, and folds into a compact shape that can be easily stored in the camera bag of user.

SUMMARY

A portable screen shade is provided, useful for digital screen displays of cameras or other devices, which is simple, lightweight and inexpensive, can completely encompass the digital screen to reduce glare, allows unrestricted access to control buttons, is easy to attach and remove from the camera, and folds into a compact shape that can be easily stored in the camera bag of user.

According to one aspect, a screen shade is provided, comprising a pre-cut, foldable cardstock sheet having four adjacent panels, each of the panels having an irregular hexagonal configuration, with a larger base tapering along opposing side edges to a narrower end. The bases of adjacent panels are interconnected along fold lines, and each base has a base end edge extending along a common base plane contiguously with the base end edges of the other panels. Each narrow end also has a narrow end edge and is spaced apart from the narrow end edge of an adjacent panel, with the narrow end edges also extending along a common narrow end plane.

The sheet can be folded along the fold lines into a four-sided shade enclosure having a partial pyramidal frustrum configuration, with an enlarged open end and a narrower viewing end, with the sides of adjacent panels tapering from the enlarged end to the narrow end. The panels can be dimensioned appropriately such that the enlarged end can be located flush against the back of the camera, surrounding the screen display on the camera.

Adjacent panels have adjacent opposing side edges, with at least one of the opposing side edges of each adjacent panel having a connecting device to connect the panel to an adjacent panel. In one embodiment, the connecting device can comprise an adhesive such as an adhesive strip applied along at least a major portion of the one side edge. In another embodiment, one of the opposing side edges of each adjacent panel can have at least one slot, and the other opposing side edge can have at least one tab, with respective tabs being dimensioned to be received in respective slots.

A closure tab can also project outwardly from a minor edge portion of a distal free edge of one of the panels. Adhesive can be provided on a surface of the closure tab for connecting the distal panel to a minor edge portion of the distal panel on the opposite end of the sheet.

Additional features can include at least one base tab projecting outwardly away from a base end edge, the base tab including an attachment device such as an adhesive or hook-and-loop fastener for removably attaching the screen shade to a camera or other device. The base tab can be configured to avoid buttons or dials on the body of the connected device.

The panels include an upper and lower panel, and side panels, in alternating relation. The side panels each include a fold line bisecting the panel from the base end to the narrow end. A flap tab spring can be positioned along an inner surface of each of the side panels across the fold line of the side panel. Each flap tab spring includes a first tab portion connected to the side panel on one side of the fold line, and a second tab portion connected to the side panel on the other side of the fold line. The tab portions of each flap tab spring normally engage each other to maintain each side panel in a flat, rigid orientation, substantially perpendicular to the upper and lower panels, such that the screen shade is maintained in an expanded configuration; and are moveable out of engagement with each other to enable each side panel to fold along the fold line to collapse the screen shade.

According to another aspect, a method for forming a screen shade for a camera from a flat cardstock sheet having four adjacent panels is provided, where each of the panels has an irregular hexagonal configuration, with a larger base tapering along opposing side edges to a narrower end, and with the bases of adjacent panels being interconnected along fold lines. Each base has an end edge extending along a common base plane with the base end edges of the other panels, and each narrow end also has an end edge and is spaced apart from an adjacent panel, with the narrow end edges also extending along a common narrow end plane. The method comprises the steps of:

i. folding the sheet along the fold lines into a four-sided shade enclosure having a partial pyramidal frustrum configuration, with an enlarged open end configured to be located flush against a display, a narrower viewing end, and sides tapering from the enlarged end to the narrower end, and ii. interconnecting the side edges of adjacent panels with one another.

The step of interconnecting the side edges of adjacent panels can comprise adhesively interconnecting the side edges of adjacent panels with one another; or inserting a tab on one of the side edges of one of the adjacent panels into a slot in the side edge of another of the adjacent panels.

The panels include an upper and lower panel, and side panels, with the side panels each including a fold line bisecting the panel from the base end to the narrow end. A flap tab spring can be positioned along an inner surface of each of the side panels across the fold line of the panel. Each flap tab spring includes a first tab portion connected to the side panel on one side of the fold line, and a second tab portion connected to the side panel on the other side of the fold line. The tab portions of each flap tab spring normally engage each other to maintain each side panel in a flat, rigid orientation, substantially perpendicular to the upper and lower panels, such that the screen shade is maintained in an expanded configuration; and further including the step of moving the tab portions out of engagement with one another and folding the adjacent side panels along the fold lines to bring upper and lower panels against one another such that the screen shade is in a collapsed configuration.

As such, a simple, lightweight and inexpensive screen shade is provided that can encompass the digital screen of a camera or other device to reduce glare, allows unrestricted access to control buttons, is easy to attach and remove from the camera, and folds into a compact shape that can be easily stored in the camera bag of user.

BRIEF DESCRIPTION OF THE DRAWINGS

FIG. 7 is a rear perspective view of the screen shade shown in an expanded configuration;

DETAILED DESCRIPTION

Figure 1:
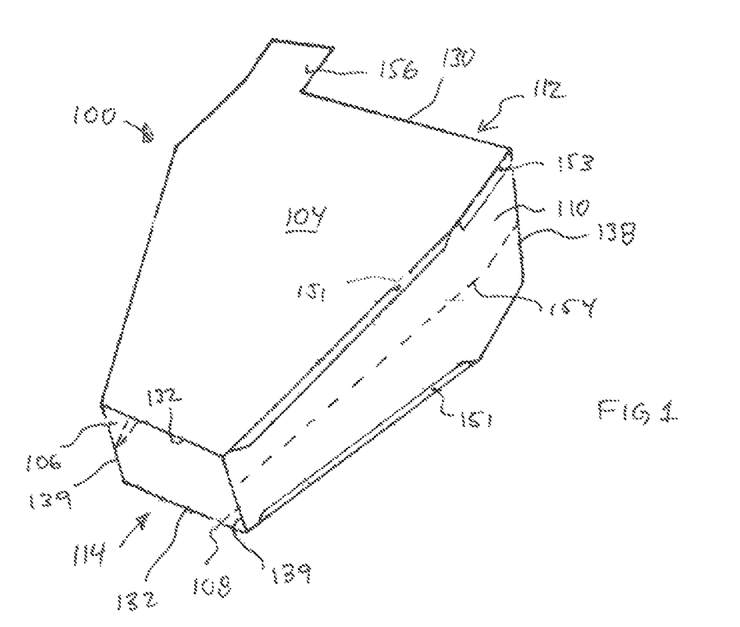
FIG. 1 is an elevated perspective view of one embodiment of the screen shade constructed according to the principles of the present invention.

Referring to the drawings, and initially to FIG. 1, a screen shade is indicated generally at 100, having four interconnected, irregular hexagonal panels, indicated at 104, 106, 108 and 110, that form a partial pyramidal frustum. An upper panel 104 is located opposite and parallel to a lower panel 108, while a first side panel 106 is located opposite to a second side panel 110, in the illustrated expanded configuration. The screen shade tapers from an enlarged open base end, indicated generally at 112, to a narrower open viewing end, indicated generally at 114. The enlarged base end 112 is configured to be located flush against a digital display such as a LCD screen display for a digital camera, to shield the screen from ambient sunlight during use (see also, FIG. 11), while the user views the image through the narrower viewing end 114.

As indicated above, the screen shade is particularly useful to shield a screen display on a camera, but it should be appreciated that the shade could likewise be used with other devices (e.g., phones, tablet readers, etc.) that have a screen display and suffer from glare and other issues with viewing the display in the sunlight or other bright light.

Figure 2:
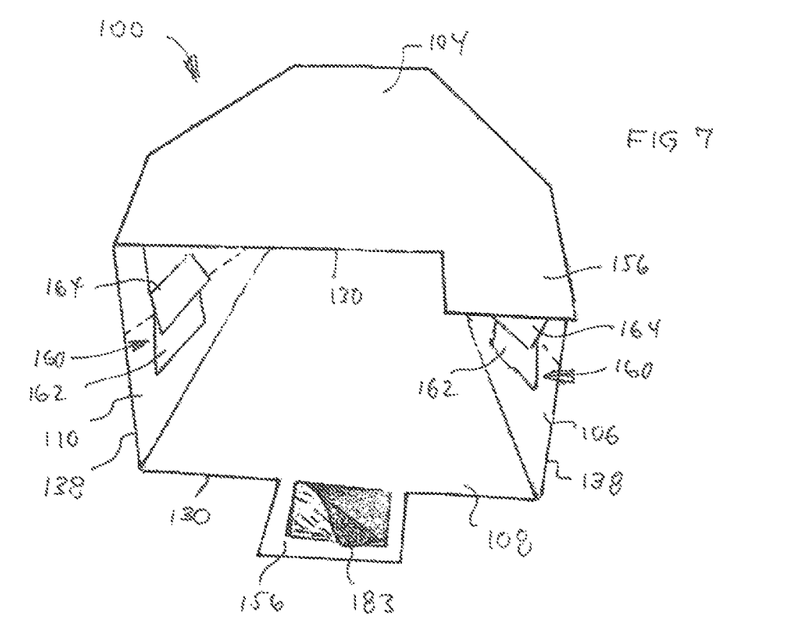
FIG. 2 is a upper plan view of the sheet for the screen shade.

Referring now also to FIG. 2, the screen shade is illustrated in its unassembled configuration, with panels 104, 106, 108, 110 shown in adjacent relation to one another; that is, with i) upper panel 104 interconnected along a fold line 120 with a first side of first side panel 106, ii) the other side of first side panel 106 interconnected along a fold line 122 with a first side of lower panel 108, and the other side of lower panel 108 interconnected along fold line 124 with a first side of second side panel 110. The inside or inner surface 125 of the panels is shown.

Upper and lower panels 104, 108 have a substantially identical, irregular hexagonal configuration; and likewise, side panels 106 and 110 also have a substantially identical, irregular hexagonal configuration. In particular, upper and lower panels 104, 108 each have a long, straight base end edge 130, a shorter, straight viewing end edge 132 parallel to the base end edge; and straight side edges 134, 136 which generally taper inwardly from the base end to the viewing end. The side panels 106, 110 also have a long, straight base end edge 138, a shorter, straight viewing end edge 139 parallel to the base end edge, and straight side edges 140, 142 which generally taper inwardly from the base end to the viewing end. As illustrated in FIG. 2, the panels all have the same length, with the base end edges 130, 138 extending along a common base plane; and the narrow end edges 132, 139, while being spaced apart from one another, likewise extending along a common narrow end plane. As indicated above, each of the panels is interconnected with an adjacent panel along a relatively short, axial side edge portion which defines fold lines 120, 122, 124, respectively, between adjacent panels. The free (un-connected) distal side edges 134, 136 of upper panel 104 and side panel 110 respectively, that is, the panels on the opposite ends of the sheet, have a relatively short, straight side edge portions 144, 146 extending axially along the sides of panels 104, 110, interconnecting side edges 134, 142 and end edges 130, 138, respectively.

Fold lines 150 are also provided adjacent to and running the majority of the length of side edges 134, 136 on upper and lower panels 104, 108 to define side flaps 151; while a single fold line 152 is provided adjacent to and running the length of the minor side edge portion 144 to define a closure tab 153. In addition, parallel fold lines 154 are provided axially along the center line of side panels 106, 110, bisecting these panels and extending between the opposite end edges 138 and 139.

Two short square or rectangular base tabs 156 project outwardly away from the end edges of the upper and lower panels, one of which is adjacent the fold line 120 between panels 104 and 106, and another which is centered on lower panel 108. The reason for such tabs will be more fully discussed below.

The screen shade is preferably formed from a single flat sheet of cardstock, poster board, cardboard or other semi-rigid paper material which is lightweight and inexpensive; although it should be appreciated that the screen shade could likewise be made from other appropriate material, such as semi-rigid plastic or thin foam board, and could be made in multiple pieces attached together instead of from a single unitary sheet. The sheet could be non-reflective, or have a non-reflective coating applied to at least the inner surface 125 of the sheet.

The shade can be formed (pre-cut) from a larger sheet of material and die-cut and/or formed as appropriate into the illustrated unassembled configuration, with fold lines as described above. The width of the base end 130 of panels 104 or 108 corresponds to the horizontal length of the screen display at the camera end of the operational shade, while the width of the base end 138 of panels 106 or 110 corresponds the vertical height of the screen display. Opposite to the broad base end, each panel's narrow or viewing end 132 or 139, has a width that is less than the width of the broad end 138. In one embodiment, the narrow ends 132 of panels 104 and 108 each have a width that is about fifty percent (50%) the width of the respective broad end 130; while the narrow ends 139 of panels 106, 110 each have a width that is about sixty percent (60%) the width of its respective broad end 138.

The length of each panel is preferably longer than the width of the panel at the base end, and in one embodiment, the length of all the panels is about fifty percent (50%) longer than the width of the base panels 104, 108.

With the above geometry, the viewing end has an area about thirty percent (30%) the area of the broader screen display end when the screen shade is assembled, and is appropriately positioned away from the camera for a pleasant and productive viewing experience.

In one embodiment, the screen shade had an enlarged base end with a dimension of approximately 3.0"W×2.25"H, a viewing end with a dimension of approximately 1.5"W× 1.375"H, and a length of approximately 4.5". As should be appreciated, the dimension of the panels could vary depending on the particular size and geometry of the screen display such that the screen shade closely surrounds the screen on the camera or other device and the viewing end of the screen is appropriately positioned for ease of viewing.

Figure 3:
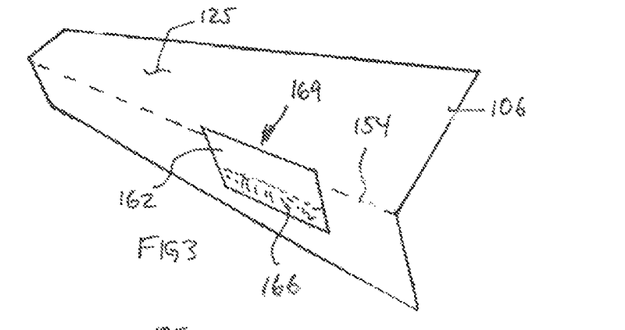
FIG. 3 is a perspective view of a side panel for the screen shade, with one tab portion of the flap-tab spring shown.
Figure 4:
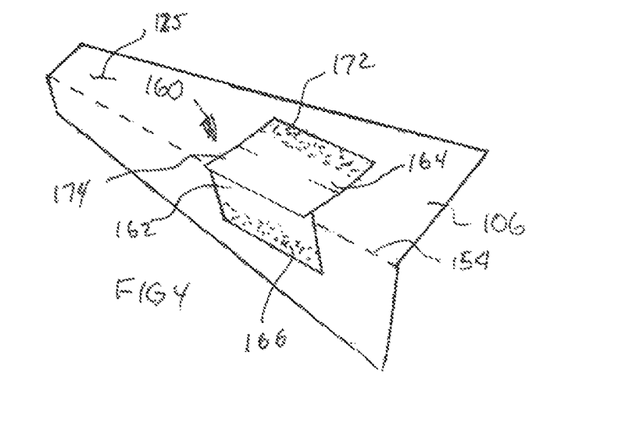
FIG. 4 is a perspective view of the panel of FIG. 3, with both tab portions of the flap-tab spring shown.

Optionally, the screen shade 100 can include a flap tab spring on each side panel which is configured to maintain the side panels in a straight, rigid orientation, perpendicular to the upper and lower panels 104, 108, and prevent the screen shade from collapsing during use. Referring now to FIGS. 3 and 4, which illustrate for sake of simplicity, just panel 106 (with side panel 110 being identical), each flap tab spring, indicated generally at 160, comprises a first square or rectangular tab portion 162, and a second square or rectangular tab portion 164, each of which are formed from relatively rigid material, such as cardstock, or whatever material is being used to form the screen shade. The first tab portion 162, as shown in FIG. 3, has an inside surface edge portion 166 (shown in phantom) which is secured such as by adhesive, directly to the inner surface 125 of side panel 106 (or 110) near or adjacent the fold line, and located such that a free edge portion, indicated generally at 169, extends across the fold line 154 from one side to the other. The second tab portion 164, as shown in FIG. 4, is similarly secured directly to the inner surface 125 of side panel 106 (or 110), with an adhesive applied to an inside surface edge portion 172, and located such that a free edge portion, indicated generally at 174, also extends across the fold line 154 from the opposite side of the fold line as first tab portion 162.

In the partially assembled state shown in FIG. 4, for example, with the side panel partially folded along fold line 154, the first tab portion 162 fits under the second tab portion 164, specifically, with the free edge portion 169 of the first tab portion fitting under the free edge portion 174 of the second tab portion, between the second tab portion and the inner surface 125 of the side panel 106.

Figure 5:
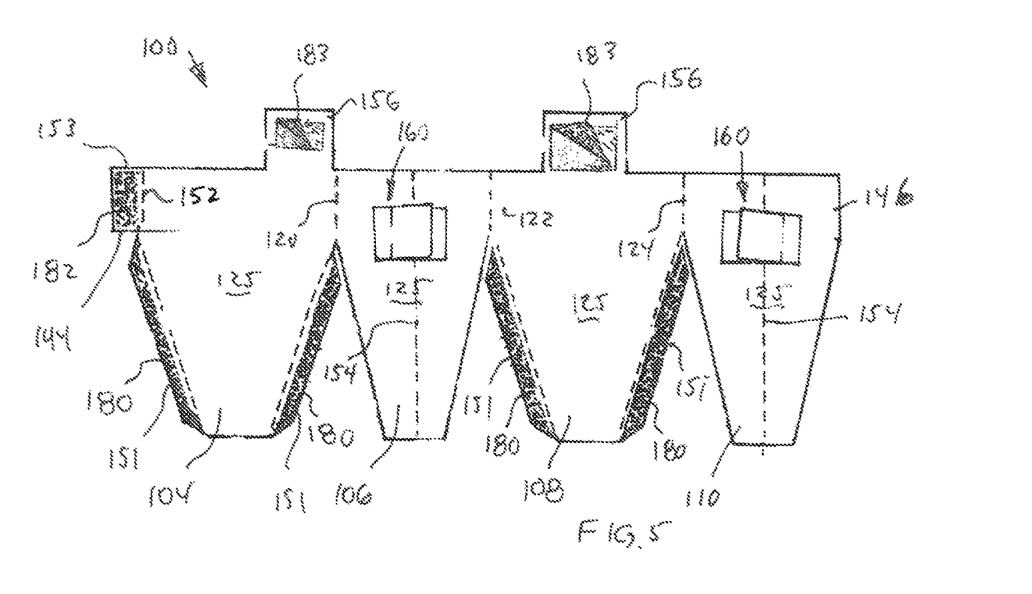
FIG. 5 is a upper plan view of the cut-out of FIG. 2, shown with the flap tab springs.

Referring now to FIG. 5, a first embodiment of the screen shade is shown where the panels of the screen shade are connected together. In particular, a first strip or layer of adhesive 180 is applied along the inside surface of side flaps 151 of the upper and lower panels 104, 108. A strip or layer of adhesive 182 is also applied along the inside surface of closure tab 153 of upper panel 104. The adhesive strips can for example be a water-activated adhesive or have a peel-off layer applied to protect a self-adhesive until use.

Optionally, an adhesive layer or pad (water activated, covered by a protective layer such as at 183, or otherwise) can be located on the inside surface of base tabs 156.

Figure 6:
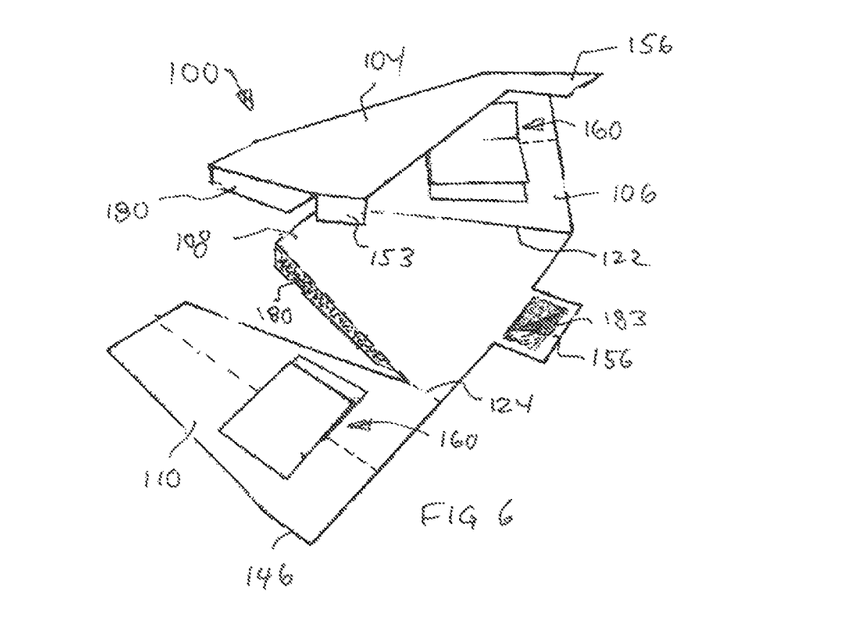
FIG. 6 is perspective view of a partially-assembled screen shade.

Referring now to FIGS. 6 and 7, a method for assembling the screen shade is shown. The adhesive strips along the side edges of the upper and lower panels, and along the closure tab 153, are initially exposed or activated. The panels of the screen shade are then folded along fold lines 120, 122 and 124, bringing the flap 151 on one side of the upper panel 104 into overlapping relation with the outer surface on one side of the first side panel 106; the flap 151 of one side of the lower panel 108 into overlapping relation with the outer surface of the second side of side panel 106; and the flap 151 on the other side of the lower panel 108 into overlapping relation with the outer surface of one side of side panel 110. The upper panel 104 is then folded inwardly such that flap 151 on the other side of upper panel 104 is brought into overlapping relation with the outer surface of the other side of side panel 110. The edges of the upper, lower and side panels 104, 106, 108 and 110 are then pressed together to adhere the adhesive to the opposing surfaces.

To complete the enclosure, the adhesive on inside surface of the closure tab 153 is also exposed, and the closure tab is pressed against the outer surface of the minor edge portion 146 on side panel 110. The panels, having an irregular hexagonal configuration, define a tapered form from the enlarged end 112 to the narrower end 114 when they are folded together and adhered, defining a partial pyramidal frustrum (see, e.g., FIG. 1).

Referring now to FIG. 7, in the expanded configuration of the screen shade, the flap tab springs 160 inter-lock, with tab portion 162 located under tab portion 164, to maintain the side panels 106, 110 in a straight and rigid orientation, substantially perpendicular to the upper and lower panels 104, 108.

Figure 8:
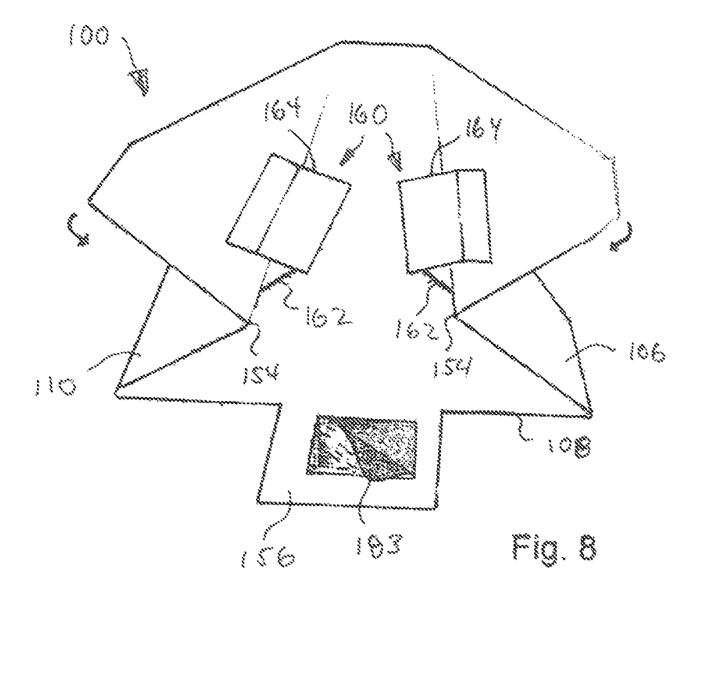
FIG. 8 is a rear perspective view of the screen shade, shown in a partially collapsed configuration.
Figure 9:
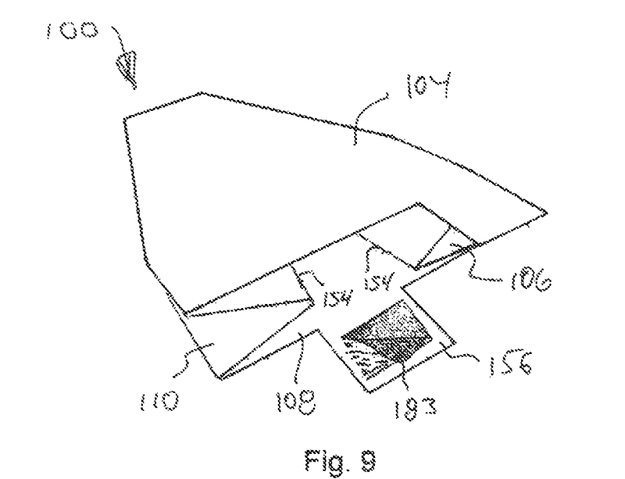
FIG. 9 is a perspective view of the screen shade shown in its collapsed configuration.

When it is desired to collapse the screen shade such as for storage, the user can press in the side panels 106, 110 together along the fold lines 154 as in FIG. 8 (shown with panel 104 removed for clarity), which will force tab portions 162 out from engagement with tab portions 164, and allow the side panels to be collapsed into a substantially flat orientation, as shown in FIG. 9. Such a flat condition allows the screen shade to be safely stored and transported without damage to the screen shade, as well as allows easy combination into an appropriate point-of sale display should that be desired.

To restore the screen shade to the expanded condition, the halves of the side panels 106, 110 are merely moved away from each other until the spring tab portions 162, 164 of flap tab springs 160 again inter-engage to hold the side panels 106, 110 in a substantially flat, rigid orientation, perpendicular to the upper and lower panels 104, 108 (e.g., as in FIG. 7).

Figure 10:
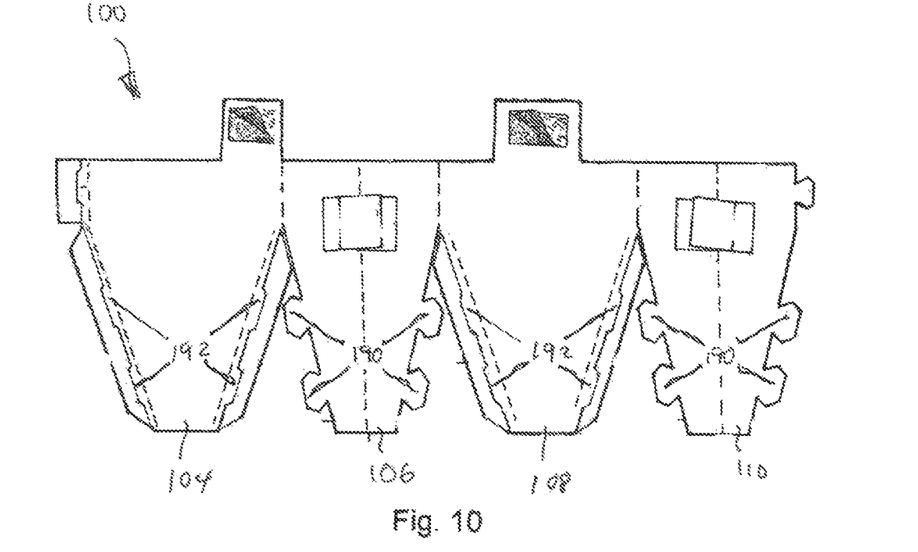
FIG. 10 is a second embodiment of the screen shade of FIG. 1.

A second embodiment of the screen display 100 is shown in FIG. 10, where instead of an adhesive attachment between the panels, a tab-in-slot arrangement is provided. Namely, one or more tabs such as at 190, along each side edge of the side panels 106, 110, can be received in appropriately-sized and located slots 192 along each side edge of the upper and lower panels 104, 108. The tabs and slots could likewise be reversed—with tabs formed in the side edge of the upper and lower panels, and the slots formed in the side edges of the side panels. In either case, the tabs have a geometry such that they are closely received with a push-fit within the slots to prevent unintended retraction from the slot, and disassembly of the screen shade. The geometry, number, size and location of the tabs and slots can be determined based on the rigidity of the card stock or other material used for the screen shade. In the illustrated embodiment, two pairs of tabs and slots are provided along each opposing edge, although again, this could vary as should be appreciated. The other aspects of the screen shade shown in FIG. 10 can be the same as in the first embodiment of FIG. 5 and will not be repeated for sake of brevity.

Figure 11:
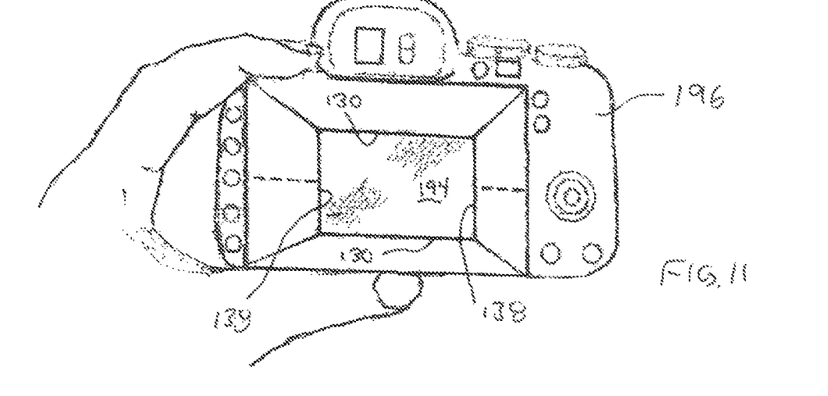
FIG. 11 is a rear view of the screen shade, shown attached to a camera.

Referring now to FIG. 11, a screen shade 100 constructed according to the principles of the present invention is shown held against the digital screen 194 of a camera 196, with the enlarged base end edges 130, 138 of the panels held flush and tight against and surrounding the camera screen. Again, it should be appreciated that the size and geometry of the panels can be easily modified depending upon the size of the screen to completely enclose the screen.

To at least temporarily hold the screen shade to the camera, the adhesive on base tabs 156 is exposed, and the two base tabs are pressed against an appropriate upper and lower surface of the camera body. The base tabs can be located to avoid buttons or dials on the body of the camera. Other attachment techniques could likewise be used instead of the adhesive, such as hook-and-loop fasteners. Or the tabs could be merely pressed against the camera body to locate and retain the screen shade against the body during use, without adhesive, that is, merely by friction. In any event, when it is desired to remove the screen shade from the camera, the base tabs can be easily detached or removed therefrom.

As described above, a simple, lightweight and inexpensive screen shade is provided that completely encompasses the digital screen of a camera or other device to reduce glare, allows unrestricted access to control buttons, is easy to attach and remove from the camera, and folds into a compact shape that can be easily stored in the camera bag of user.

The principles, preferred embodiments, and modes of operation of the present invention have been described in the foregoing specification. The invention which is intended to be protected herein should not be construed as limited to the particular forms as described previously. The foregoing forms are to be regarded as illustrative rather than restrictive. Variations and changes may be made by those skilled in the art without departing from the scope and spirit of the invention as set forth in the appended claims.

What is claimed is:

1. A screen shade, comprising:
a foldable sheet having four adjacent panels, each of the panels having an irregular hexagonal configuration, with a larger base end tapering along opposing side edges to a narrower end, with sides of adjacent panels interconnected along fold lines, and each base end having a base end edge extending along a common base plane with the base end edges of the other panels, and each narrower end also having a narrow end edge and being spaced apart from a narrower end of an adjacent panel, wherein the sheet can be folded along the fold lines between the panels into a four-sided shade enclosure, with an enlarged end configured to be located against a screen display, and a narrower viewing end, with adjacent panels in interconnected relation.

2. The screen shade as in claim 1, wherein each narrow end edge also extends along a common narrow end plane with the narrow end edges of the other panels.

3. The screen shade as in claim 1, further including at least one base tab projecting outwardly away from a base end edge.

4. The screen shade as in claim 3, wherein the base tab includes an adhesive on a surface of the base tab for attaching the shade to a screen display.

5. The screen shade as in claim 1, wherein the fold lines between the panels are arranged in parallel relation to one another.

6. The screen shade as in claim 1, wherein adjacent panels have adjacent opposing side edges, with one of the opposing side edges of each adjacent panel having an adhesive along at least a major portion of the one side edge.

7. The screen shade as in claim 6, wherein the adhesive is an adhesive strip extending along the one side edge.

8. The screen shade as in claim 1, wherein adjacent panels have adjacent opposing side edges, with one of the opposing side edges of each adjacent panel having at least one slot, and the other of the opposing side edges of each adjacent panel having at least one tab, with respective tabs being dimensioned to be receivable in respective slots.

9. The screen shade as in claim 1, further including a closure tab projecting outwardly away from a minor edge portion of one of the side edges of a distal one of the panels, and an adhesive on a surface of the closure tab for connecting the distal panel to a minor edge portion of one of the opposing side edges of another distal one of the panels.

10. The screen shade as in claim 1, wherein the panels include an upper panel, a lower panel and two side panels, with the side panels each located between the upper and lower panels, and with the side panels each including a panel fold line bisecting the respective side panel from the base end to the narrow end.

11. The screen shade as in claim 10, further including a flap tab spring positioned along an inner surface of each of the side panels across the panel fold line of the respective side panel.

12. The screen shade as in claim 11, wherein each flap tab spring includes a first tab portion connected to the respective side panel on one side of the panel fold line of the side panel, and a second tab portion connected to the side panel on the other side of the panel fold line of the side panel, and each of the tab portions of each flap tab spring normally engaging one another to maintain each side panel in a flat, rigid orientation and being disengageable with respect to one another to enable each side panel to fold along the panel fold line of the side panel.

13. The screen shade as in claim 1, wherein the sheet is cardstock.

14. The screen shade as in claim 1, further including at least one base tab projecting outwardly away from a base end edge, and wherein i) adjacent panels have adjacent opposing side edges, with one of the opposing side edges of each adjacent panel having a connecting device along the one side edge, and ii) the panels include an upper panel, a lower panel and two side panels, with the side panels each located between the upper and lower panels, and with the first and second side panels each including a panel fold line bisecting the respective side panel from the base end to the narrow end, and further including a flap tab spring positioned along an inner surface of each of the side panels across the panel fold line of the respective side panel.

15. A screen shade for a camera screen display, the screen shade comprising:
 a sheet having four adjacent panels, each of the panels having an irregular hexagonal configuration, with an enlarged base end configured to be located against the camera screen display tapering along opposing sides to an narrower viewing end, with the enlarged base end being defined by bases of adjacent panels interconnected along fold lines, with each base end having an end edge extending along a common base plane with the base end edges of the other panels, and each narrower end also having an end edge and being interconnected to a narrow end of an adjacent panel, wherein the sheet is folded along the fold lines between the panels into a four-sided enclosure.

16. The screen shade as in claim 15, further including at least one base tab projecting outwardly away from a base end edge.

17. The screen shade as in claim 15, wherein the panels include an upper panel, a lower panel and two side panels, with the side panels each located between the upper and lower panels, and with the first and second side panels each including a panel fold line bisecting the respective side panel from the base end to the narrow end, and further including a flap tab spring positioned along an inner surface of each of the side panels across the panel fold line of the respective side panel.

18. The screen shade as in claim 17, wherein each flap tab spring includes a first tab portion connected to the side panel on one side of the panel fold line of the side panel, and a second tab portion connected to the side panel on the other side of the panel fold line of the side panel, and each of the tab portions of each flap tab spring engaging one another to maintain each side panel in a flat, rigid orientation, and being disengageable with respect to one another to enable each side panel to fold along the panel fold line of the side panel.

19. The screen shade as in claim 15, wherein the screen shade has a partial pyramidal frustrum configuration.

20. A method for forming a screen shade from a pre-cut flat sheet having four adjacent panels, each of the panels having an irregular hexagonal configuration, with a longer base end tapering along opposing side edges to a narrower end, with sides of adjacent panels being interconnected along fold lines and each base end having an end edge extending along a common base plane with the base end edges of the other panels, and each narrower end also having an end edge and being spaced apart from a narrower end of an adjacent panel, comprising the steps of:
 a. folding the sheet along the fold lines between the bases into a four-sided, partial pyramidal frustrum shade enclosure, with an enlarged end configured to be located against a screen display, a narrower viewing end, and sides tapering from the enlarged end to the narrower end, and
 b. interconnecting the side edges of adjacent panels with one another.

* * * * *